United States Patent [19]
Marlowe et al.

[11] Patent Number: 5,517,540
[45] Date of Patent: May 14, 1996

[54] TWO-STEP PROCESS FOR BONDING THE ELEMENTS OF A THREE-LAYER CLADDING TUBE

[75] Inventors: Mickey O. Marlowe, Fremont; Joseph S. Armijo, Saratoga, both of Calif.; Cedric D. Williams, Wilmington, N.C.; Herman S. Rosenbaum, Fremont, Calif.

[73] Assignee: General Electric Company, San Jose, Calif.

[21] Appl. No.: 215,457

[22] Filed: Mar. 21, 1994

Related U.S. Application Data

[63] Continuation-in-part of Ser. No. 91,672, Jul. 14, 1993, Pat. No. 5,383,228.

[51] Int. Cl.$^6$ .................................................... G21C 3/00
[52] U.S. Cl. ........................ 376/409; 376/416; 376/417; 376/457
[58] Field of Search ....................... 376/409, 414, 376/416, 417, 457; 148/672, 714; 29/25.02

[56] References Cited

U.S. PATENT DOCUMENTS

| | | | |
|---|---|---|---|
| 4,689,091 | 8/1987 | Yoshida et al. | 148/11.5 F |
| 4,810,461 | 3/1989 | Inagaki et al. | 376/457 |
| 4,894,203 | 1/1990 | Adamson | 376/416 |
| 4,995,548 | 2/1991 | Wang et al. | 228/131 |
| 5,076,488 | 12/1991 | Graham | 228/131 |
| 5,223,478 | 6/1993 | Witlow et al. | 505/1 |
| 5,297,177 | 3/1994 | Inagaki et al. | 376/462 |
| 5,373,541 | 12/1994 | Mardon et al. | 376/457 |

*Primary Examiner*—Donald P. Walsh
*Assistant Examiner*—Meena Chelliah
*Attorney, Agent, or Firm*—James E. McGinness; Jeffrey K. Weaver

[57] ABSTRACT

A method is provided for preparing a cladding tube having an outer substrate, an intermediate zirconium barrier layer, and an inner liner. The method includes the following steps: (a) bonding an inner liner alloy sheath exterior circumferential surface to a zirconium sheath interior circumferential surface to form a barrier/inner liner sheath, and (b) bonding the exterior surface of the zirconium sheath on the barrier/inner liner sheath to the interior circumferential surface of an outer substrate alloy tube to form the cladding tube. Alternatively, the method includes the following steps: (a) bonding the zirconium sheath exterior circumferential surface to the outer substrate alloy tube interior circumferential surface to form a substrate tube/barrier sheath, and (b) bonding the exterior circumferential surface of the inner liner alloy sheath to the interior circumferential surface of the zirconium sheath of the substrate tube/barrier sheath to form said cladding tube. In either approach the tube produced by step (a) is heat treated before step (b) is performed. The bonding steps are performed by extrusion and sometimes hot isostatic pressing.

17 Claims, 3 Drawing Sheets

TWO-STEP PROCESS FOR BONDING THE ELEMENTS OF A THREE-LAYER CLADDING TUBE

CROSS-REFERENCE TO RELATED APPLICATIONS

This application is a continuation-in-part of U.S. patent application Ser. No. 08/091,672 entitled METHOD FOR MAKING FUEL CLADDING HAVING ZIRCONIUM BARRIER LAYERS AND INNER LINERS filed on Jul. 14, 1993, U.S. Pat. No. 5,383,288 issued on Jan. 17, 1995 assigned to the assignee hereof, and incorporated herein by reference in its entirety for all purposes.

BACKGROUND OF THE INVENTION

The present invention relates to a method of preparing fuel cladding having three-layers: an outer substrate, a zirconium barrier layer, and an inner liner. More specifically, the invention relates to methods of joining the outer substrate, zirconium barrier layer, and inner liner components in two separate bonding steps.

Nuclear reactors have their fuel contained in sealed cladding for the isolation of the nuclear fuel from the moderator/coolant system. The term cladding, as used herein, refers to a zirconium based alloy tube. Often the cladding will be composed of layers including a zirconium alloy substrate and an unalloyed zirconium barrier.

The cladding—nominally in the order of 0.030 inches thick—is formed in the shape of a tube with the nuclear fuel contained typically in pellet form therein. These pellets are stacked in contact with one another for almost the entire length of each cladding tube, which cladding tube is in the order of 160 inches in length. Typically, the cladding tube is provided with springs for maintaining the axial position of the fuel pellets and so-called "getters" for absorbing excess moisture. The internal portions of the fuel rod are pressurized with helium to help conduct the heat from the fuel material to the cladding.

Zirconium and its alloys, under normal circumstances, are excellent for nuclear fuel cladding since they have low neutron absorption cross sections and, at temperatures below about 350° C., are strong, ductile, extremely stable and relatively nonreactive in the presence of demineralized water or steam. "Zircaloys" are a family of corrosion-resistant zirconium alloy cladding materials. They are composed of 98–99% by weight zirconium, with the balance being tin, iron, chromium, and nickel. "Zircaloy-2" and "Zircaloy-4" are two widely-used zirconium-based alloys for cladding. Zircaloy-2 has on a weight basis about 1.2 to 1.7 percent tin; 0.13–0.20 percent iron; 0.06–0.15 percent chromium and 0.05 to 0.08 percent nickel. Zircaloy-4 has essentially no nickel and about 0.2% iron but is otherwise substantially similar to Zircaloy-2.

Splitting of Zircaloy cladding may occur due to various causes including debris induced fretting and pellet-cladding interaction. In the first of these, debris lodges next to the cladding and vibrates or frets against the cladding wall under the influence of the passing coolant. Such vibration continues until the cladding wall is penetrated. Pellet-cladding interaction is caused by the interactions between the nuclear fuel, the cladding, and the fission products produced during the nuclear reaction. It has been found that this undesirable effect is due to localized mechanical stresses on the fuel cladding resulting from differential expansion and friction between the fuel and the cladding in coincidence with corrosive fission product species causing stress corrosion cracking.

To combat defects due to pellet-cladding interaction, some cladding includes pure zirconium barrier layers metallurgically bonded to the inner surface of the tubing. The pioneering work on barrier layer cladding is described in U.S. Pat. Nos. 4,200,492 and 4,372,817 to Armijo and Coffin, U.S. Pat. No. 4,610,842 to Vannesjo, and U.S. Pat. No. 4,894,203 to Adamson, each of which is incorporated herein by reference for all purposes. Barrier layers have been found to effectively prevent damage to the cladding due to interaction with the pellet. However, if the cladding wall is compromised in some manner (e.g. perforated or split by debris fretting), and water enters the fuel rod interior, the barrier layer can be rapidly oxidized.

To protect the zirconium barrier from oxidation should a cladding breach occur, a three-layer structure may be employed. See e.g., U.S. patent application Ser. No. 08/091,672 entitled METHOD FOR MAKING FUEL CLADDING HAVING ZIRCONIUM BARRIER LAYERS AND INNER LINERS and U.S. patent application Ser. No. 08/092,188 entitled INNER LINERS FOR FUEL CLADDING HAVING ZIRCONIUM BARRIER LAYERS, both of which were filed on Jul. 14, 1993 and assigned to the assignee hereof. Both applications are incorporated herein by reference in their entirety for all purposes. In addition to the substrate and zirconium barrier, three-layer cladding includes a very thin corrosion resistant inner liner bonded to the fuel side of the barrier. Typically, the inner layer will be made from a Zircaloy or modified Zircaloy. If the cladding is breached and steam forms in the fuel rod interior, the inner liner will protect the barrier from rapid oxidation. Although this three layer design represents a significant advance, methods of forming three-layer cladding can be difficult to implement to perfection. For example, sometimes certain components of the cladding require heat treatments and other processing that can be detrimental to other components of the cladding.

While the methods of preparing three layer cladding taught in U.S. patent application Ser. No. 08/091,672 provide cladding having substantial protection against damage from pellet-cladding interaction and rapid corrosion, it is still desirable to develop other flexible methods for preparing claddings having the same or improved properties.

SUMMARY OF THE INVENTION

The present invention provides a method of preparing a three-layer cladding tube having an outer substrate, an intermediate zirconium barrier layer, and an inner liner. The cladding tube is fabricated from an outer substrate alloy tube, a zirconium sheath, and an inner liner alloy sheath, each of which has interior and exterior circumferential surfaces. At some point during the method of this invention, two of the three components are bonded to one another through the appropriate interior and exterior surfaces. Later, the third component is bonded to the other two—previously bonded—components. By separating the bonding process into two substeps, considerable flexibility is introduced in the process. For example, heat treatment steps such as diffusion anneals can be performed on the inner liner alloy sheath and zirconium sheath without effecting the outer substrate alloy tube (which might have a microstructure that would be detrimentally affected by the heat treatment).

In a preferred embodiment of the invention, the method includes the following steps: (a) bonding the inner liner alloy sheath exterior circumferential surface to the zirconium sheath interior circumferential surface to form a barrier/inner liner sheath, and (b) bonding the exterior surface of the zirconium sheath on the barrier/inner liner sheath to the interior circumferential surface of the outer substrate alloy tube to form the cladding tube. In this process, the outer substrate alloy tube becomes the outer substrate, the zirconium sheath becomes the intermediate zirconium barrier layer, and the inner liner alloy sheath becomes the inner liner. Preferably, at least one of steps (a) and (b) is an extrusion step. After the bonding steps have been completed, a series of tube reduction steps including cold work passes are conducted to produce cladding for use in fuel rods.

In an alternative preferred embodiment, the method includes the following steps: (a) bonding the zirconium sheath exterior circumferential surface to the outer substrate alloy tube interior circumferential surface to form a substrate tube/barrier sheath, and (b) bonding the exterior circumferential surface of the inner liner alloy sheath to the interior circumferential surface of the zirconium sheath of the substrate tube/barrier sheath to form the cladding tube.

During fabrication processes according to this invention, the dimensions of the various components are carefully controlled. In many embodiments, the substrate and barrier layer, or the inner liner are bonded to one another by extrusion. However, in some preferred methods of this invention, these components are bonded by hot isostatic pressing or another technique which provides dimensional stability that may not be available with extrusion. In preferred embodiments, one or both of the bonding steps includes substeps of first conducting a hot isostatic pressing step and then coextruding the components pressed together.

A further understanding of the invention may be obtained by reference to the drawings and description of specific embodiments which follow.

DESCRIPTION OF THE PREFERRED EMBODIMENTS

I. The Cladding Tube Structure

As used herein, the phrase "alpha crystalline structure" or "alpha phase" means the hexagonal close-packed crystal lattice structure of zirconium and zirconium-containing alloys that is stable at lower temperatures. The temperature range in which the alpha phase is stable is referred to as the alpha range. For Zircaloy-2, the alpha phase exists at temperatures lower than about 820° C.

As used herein, the term "beta crystalline structure" or "beta phase" means the body-centered cubic crystal lattice structure of zirconium and zirconium-containing alloys that is stable at higher temperatures. The temperature range in which the beta phase is stable is referred to as the beta range. For Zircaloy-2, the pure beta phase exists at temperatures above about 960° C.

Figure 1:
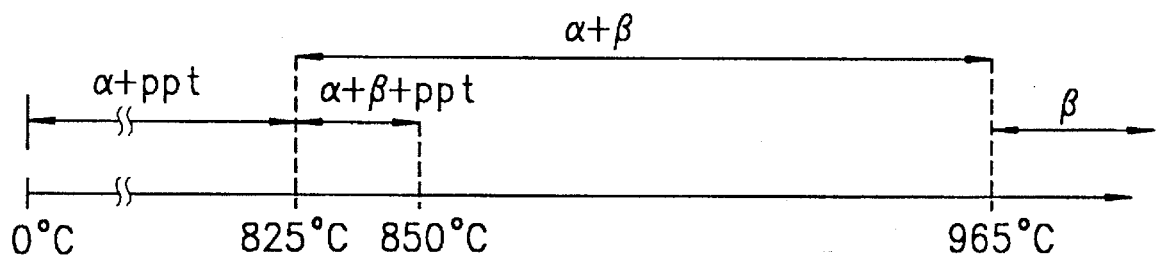
FIG. 1 is a phase chart for a typical zirconium containing alloy.

As used herein, the term "alpha plus beta crystalline structures" or "alpha plus beta phases" refers to mixtures of the alpha and beta phases that exists at some temperatures in some zirconium alloys—but not pure zirconium. In pure zirconium, the alpha crystalline structure is stable up to about 860° C. At about this temperature a phase change occurs to form a beta crystalline structure which is stable at temperatures above about 860° C. Zirconium alloys, in contrast, have a range of temperatures over which the alpha to beta phase change occurs. In this range, a mixture of alpha and beta crystalline structure is stable. The specific temperature range in which the mixture is stable depends on the specific alloy. Zircaloy-2, for example, exhibits a stable mixture of alpha plus beta crystalline structures from about 825° C. to about 965° C. Below about 850° C., intermetallic precipitates form. FIG. 1 shows the various phase regions for Zircaloy-2.

As used herein, the term "tubing" refers to a metal tube having various uses, and the term "fuel rod container" or simply "container" refers to tubing used in fuel rods to enclose fuel pellets. Sometimes the fuel rod container is referred to as "cladding" or "cladding tube".

Figure 2:
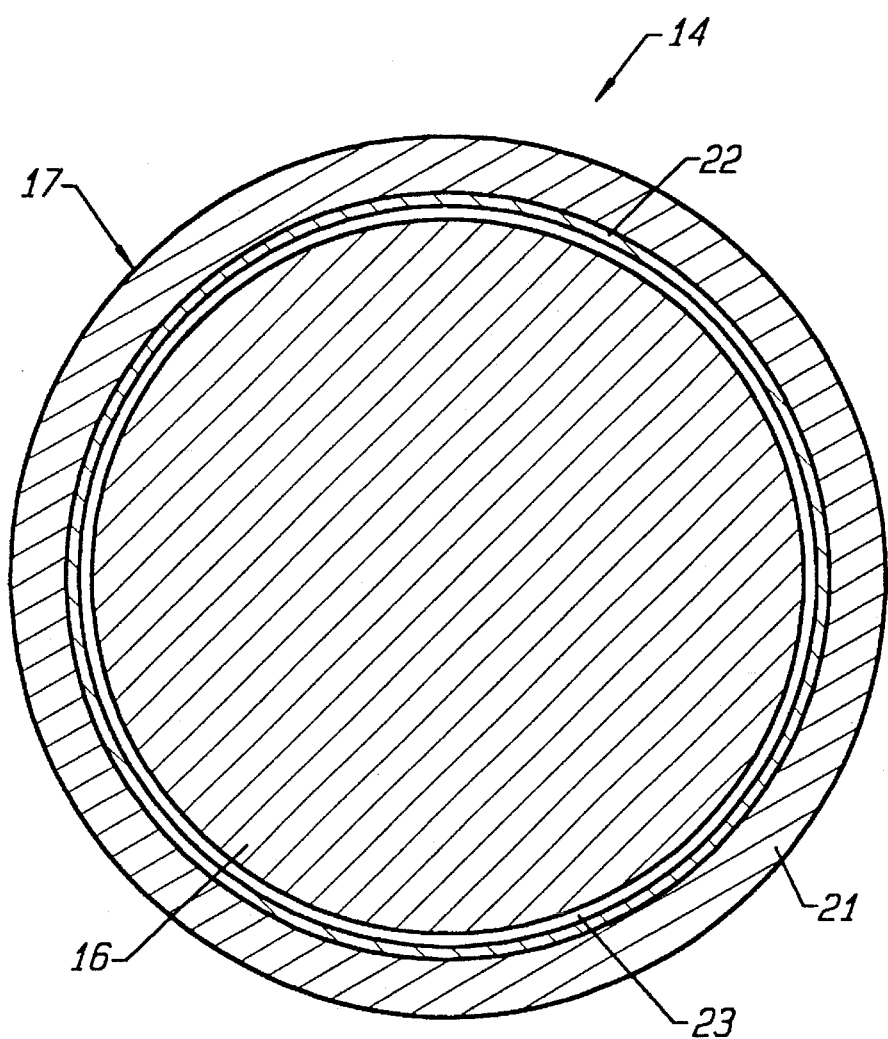
FIG. 2 is a cross sectional view of a nuclear fuel element of this invention having a substrate, a barrier layer, and an inner liner.

Referring to FIG. 2, a fuel element 14 (commonly referred to as a fuel rod) prepared according to the present invention is shown. Fuel element 14 includes a fuel material core 16 and a surrounding container 17. The fuel element 14 is designed to provide excellent thermal contact between the fuel rod container 17 and the fuel material core 16, a minimum of parasitic neutron absorption, and resistance to bowing and vibration which is occasionally caused by flow of coolant at high velocity. The fuel material core is typically composed of a plurality of fuel pellets of fissionable and/or fertile material. The fuel core may have various shapes, such as cylindrical pellets, spheres, or small particles. Various nuclear fuels may be used, including uranium compounds, thorium compounds and mixtures thereof. A preferred fuel is uranium dioxide or a mixture comprising uranium dioxide and plutonium dioxide.

The cladding tube 17 is a composite structure including a substrate 21, a zirconium barrier 22, and an inner layer or liner 23. The substrate forms the outer circumferential region of a cladding tube, the inner layer forms an inner circumferential region of the cladding tube, and the zirconium barrier is located therebetween.

The substrate may be made from a conventional cladding material such as a zirconium alloy. Suitable zirconium alloys for the substrate preferably include at least about 98% zirconium, up to about 0.25% iron, up to about 0.1% nickel, up to about 0.25% chromium, and up to about 1.7% tin (all percents by weight). Other alloying elements may include niobium, bismuth, molybdenum, as well as various other elements used in the art. Most generally, any zirconium alloy with suitable corrosive resistance to BWR water and with sufficient strength and ductility may be employed. In a preferred embodiment of this invention, the substrate is Zircaloy-2 or Zircaloy-4.

Metallurgically bonded on the inside surface of substrate 21 is the zirconium barrier 22. See the above-mentioned U.S. Pat. Nos. 4,200,492 and 4,372,817 to Armijo and Coffin, U.S. Pat. No. 4,610,842 to Vannesjo, and U.S. Pat. No. 4,894,203 to Adamson. In preferred embodiments, the zirconium barrier is at least partially alloyed so that it resists rapid corrosion in the event of a cladding breach and the subsequent ingress of steam. It is known that the presence of alloying elements such as iron and nickel in zirconium can provide resistance to rapid corrosion. Such protection may be provided by imparting a significant alloying element concentration to the barrier layer through a diffusion anneal step. This will drive some of the elements from the substrate or inner liner into the zirconium barrier layer.

The alloying elements in the barrier layer should simply be present in concentrations sufficient to provide some measure of protection against rapid corrosion without significantly compromising the compliance of the zirconium. It is especially important that the alloying elements be present at the inner surface of the zirconium barrier layer (adjacent to the inner liner). This ensures that if the barrier layer becomes exposed to a corrosive environment as a result of a defect in the inner liner, the barrier layer surface (its inner surface) will have some measure of corrosion protection. Suitable concentrations of alloying elements at the zirconium barrier inner surface are (on a per weight basis) at least about 0.03 percent iron, at least about 0.01 percent chromium, and at least about 0.01 percent nickel. More preferably, these concentrations should be about between about 0.03 and 0.4 percent iron, between about 0.01 and 0.2 percent chromium, and between about 0.01 and 0.2 percent nickel. Other details of the barrier layer such as the concentration profile of the alloying elements in the barrier layer are found in U.S. patent application Ser. No. 08/215,456 entitled "METHOD OF PREPARING FUEL CLADDING HAVING AN ALLOYED ZIRCONIUM BARRIER LAYER," filed concurrently herewith, naming Adamson et al. as inventors, assigned to the assignee hereof, and incorporated herein by reference for all purposes.

Metallurgically bonded to the inside surface of the zirconium barrier 22 is the inner liner 23. This layer provides some protection of the zirconium barrier from rapid oxidation should the fuel element interior come in contact with steam. Thus, the inner liner should be a relatively corrosion resistant material such as Zircaloy. However, modified Zircaloys and other corrosion resistant materials may also be employed. For example, the inner liner may be softer than conventional Zircaloy so that crack initiation and propagation on the inner surface of the cladding tube are minimized. See U.S. patent application Ser. No. 08/092,188, previously incorporated herein by reference. In an alternative embodiment, the inner liner may be made from an alloy designed to have strongly hydrogen absorbing properties. One such material is a zirconium alloy having a high concentration of nickel (e.g., up to 15% nickel).

In some embodiments, the inner liner is so thin that it is completely consumed by interdiffusion with the barrier layer in a diffusion anneal. The resulting cladding contains a barrier layer having significant resistance to rapid corrosion because of the increased alloying element concentration at the barrier layer inner region (where it is most susceptible to corrosion). The diffusion anneal also homogenizes the concentration distribution over the barrier layer's inner surface. (This advantage of the diffusion anneal also results when the inner liner is retained in the final cladding.) Thus, if there were any tears or other defects in the inner liner (that could provide a site for rapid corrosion), the diffusion anneal causes the alloying elements to move into the barrier layer at these defects sites to protect against rapid corrosion. Aside from the inner liner being completely consumed in a diffusion anneal, the product cladding tube is structurally similar to the three-layer cladding tube described above.

Further details of the structure formed according to the methods of this invention are found in U.S. patent application Ser. No. 08/215,458 entitled A NUCLEAR FUEL CLADDING HAVING AN ALLOYED ZIRCONIUM BARRIER LAYER filed concurrently herewith, assigned to the assignee hereof, and incorporated herein by reference for all purposes.

II. Manufacture of the Tubing

This invention has as a goal producing a cladding by a method in which the cladding components are bonded to one another in two separate steps. In a first step, a zirconium barrier sheath is bonded to either an outer substrate alloy tube or an inner liner alloy sheath, but not both, to form a two-part composite assembly. In a second step, the two-part composite assembly (either a substrate tube/barrier sheath or a barrier/inner liner sheath) formed in the first step is bonded to the remaining component (either the outer substrate alloy tube or an inner liner alloy sheath).

Generally the process is started with a Zircaloy or other suitable alloy ingot melt which is forged, pierced, and expanded to produce a thick-walled billet. The billet is quenched from the beta phase at about 1000° C. to about 700° C. by immersion in a tank of water. Maintaining a proper quench rate is important in the temperature range between 1000° C. and 700° C.; after 700° C. is reached, however, the rate of cooling can be increased or decreased as desired. The quench rate is preferably faster than about 5° C. per second. More preferably, the quench rate will be faster than about 50° C. per second.

After the beta quench, the barrier layer and inner liner are bonded—in two steps—to the interior of the substrate. Both of these layers are provided as sheaths or sleeves formed in one or more steps from billets of the appropriate material—zirconium for the barrier layer and a zirconium alloy for the inner liner. Some cold working, annealing, and surface conditioning steps designed for tube size reduction and dimensional stability can then be employed. This results in a tubular section referred to as a tubeshell which is subsequently subjected to various annealing, cold working, and other steps to produce the final fuel rod cladding. Suitable billets, sheaths, etc, are available from various vendors such as Teledyne Wahchang (Albany, Oreg., USA), Western Zirconium (A Westinghouse company of Ogden, Utah), and Cezus (France).

During the entire fabrication sequence, dimensional control of the cladding must be maintained. In the cladding—having a relatively hard zirconium alloy liner bonded to a relatively softer barrier layer—the inner liner can easily become deformed or breached during processing. The resulting cladding may be unable to adequately protect the zirconium barrier layer during the reactor life cycle. In the present invention, one or more steps is employed to maintain adequate dimensional control of the three layers. For example, the layers can be subjected to careful surface treatment before they are bonded to one another. Special surface treatments may also be employed after bonding to maintain dimensional control. Suitable surface treatments are described in U.S. patent application Ser. No. 08/091,672 entitled METHOD FOR MAKING FUEL CLADDING HAVING ZIRCONIUM BARRIER LAYERS AND INNER LINERS, previously incorporated by reference.

Various methods may be employed to bond the components to one another. However, because an extrusion step must be conducted regardless of whether any other techniques are employed to bond the components, extrusion is the preferred bonding process. The extrusion process itself provides the necessary energy (in the form of compression) to bond the two layers. Extrusion is accomplished by putting the tube through a set of tapered dies under high pressure at about 1000° to 1400° F. (about 538° to 760° C.). Suitable extruders are available from Mannessmann Demang, Coreobolis, Pa.

Extrusion sometimes provides insufficient dimensional control because of the temperature and large reduction in wall thickness during the process. Therefore, some alternative embodiments of the present invention will employ a step of bonding the barrier layer or barrier layer plus the inner liner to the substrate before or after the extrusion step.

One preferred alternative method of bonding the components is hot isostatic pressing. In this process, an assembly of the components to be bonded is placed in a large pressure vessel at very high atmospheric loading so that gas pressure forces the pieces together to form a metallurgical bond. For a Zircaloy-2 substrate, a zirconium barrier layer, and a modified Zircaloy-2 inner liner, the pressing step is preferably conducted at a temperature of between about 400° C. and 850° C. and at a pressure of between about 13,000 and 40,000 psi. More preferably, the pressing is conducted at a temperature of between about 400° C. and 700° C. and at a pressure of between about 20,000 and 40,000 psi. Depending upon the temperature and pressure employed, the pressure is preferably applied for between about 4 and 20 hours. Suitable apparatus for performing hot isostatic pressing are available from ASEA (Sweden).

In another method, the barrier and inner liner sleeves are bonded to the billet inner surface by heating (such as at 750° C. for 8 hours) to give diffusion bonding between the tubes and the billet. In yet another method, the components are bonded to the billet by an explosive bonding process in which a charge is detonated within the cladding tube assembly. The force of the explosion drives the components together to form permanent bonds.

In any bonding process described herein, two components are first joined at their ends by electron beam welding or other conventional process prior to the bonding step. This maintains the desired alignment of the components during the bonding step and provides an essentially gas-free, clean interface between surfaces. In electron beam welding, an electron beam is used in a high vacuum to heat the ends of the cylindrical tubes until they fuse to form a composite.

In preferred embodiments, the two-part composite assembly formed in the first step is subjected to a diffusion anneal or other heat treatment step. A diffusion anneal will cause some alloying elements to diffuse into the zirconium sheath and impart some corrosion resistance as described above. Suitable diffusion temperatures and times include about 650°–825° C. for between about 4 and 20 hours. At 825° C., the time should be closer to 4 hours, while at 650° C., time should be between about 10 and 20 hours. As will be apparent to those of skill in the art, the diffusion anneal can be performed with various commercially available pieces of equipment such as a vacuum furnace, an inert gas furnace, or an induction coil. Suitable vacuum annealing furnaces are available from Centorr Vacuum Industries of Nashua, N.H.

In some embodiments, the component that is not used in the first bonding step (i.e., the outer substrate alloy tube or the inner liner alloy sheath) is also subjected to a heat treatment before the second bonding step. For example, the outer substrate alloy tube can be heat treated to give a corrosion resistant precipitate microstructure as described below.

After any heat treatment steps, the two-part subassembly and the remaining unbonded component are bonded in the second bonding step to form a three-layer structure. This second bonding step can be conducted by extrusion alone, a combination of hot isostatic pressing and extrusion, or any other bonding technique as described above. The three-layer structure is then processed as necessary to form a tubeshell.

The tubeshell is subjected to multiple passes of cold working—usually with a pilger mill—to impart the dimensions required for a particular application. After each cold work step, an anneal is conducted for e.g. about two to four hours to relieve stress and regain ductility. Preferably, the cold work passes are each conducted to between about 30 and 80%, although this is not critical to the invention. The percent value of cold work is analogous to the percent reduction of the tube cross-sectional area during the process. It will be understood by the reader that pilger mills are generally available, albeit fairly complicated, pieces of equipment. During cold working with a pilger mill, a shaped die is rolled on the outside of the tube while a hard tapered mandrel supports the inside of the tube. In this manner, the wall thickness and diameter of the tube are simultaneously reduced. Further details of the cold working process are provided in the above-mentioned U.S. patent application Ser. No. 08/091,672.

To impart additional corrosion resistance to the outer circumferential region of the substrate, a step of selectively heating and rapidly quenching the outer region from the alpha plus beta region or the pure beta region while maintaining the inner region at a lower temperature preferably may be performed during the subsequent tube reduction processing. This creates a metallurgical gradient in which the outer region contains fine precipitates, while the inner region retains coarse precipitates. This heat treatment step can be accomplished by various methods including induction coil heating as described below. It may also be desirable to create or preserve coarse precipitates in the inner region of the tube by performing at least one high temperature anneal and/or performing the recrystallization anneals at relatively high temperatures. As used herein, a high temperature anneal refers to a process conducted at between about 650° and 750° C. for between about 1 and 100 hours. A coarse precipitate microstructure generally resists crack propagation. In one embodiment, the outer substrate alloy tube contains (1) precipitates having an average size distribution proximate the inner surface of the outer substrate tube of at least about a first predefined diameter (e.g., about 0.2 micrometers) and (2) precipitates having an average size distribution proximate the outer surface of the outer substrate alloy tube of at most a second predefined diameter (e.g., about 0.1 micrometers), wherein the first predefined diameter is greater than the second predefined diameter. A more detailed discussion of the procedure employed to produce this microstructure is provided in U.S. patent application Ser. No. 08/052,793 entitled ZIRCALOY TUBING HAVING HIGH RESISTANCE TO CRACK PROPAGATION and U.S. patent application Ser. No. 08/052,791 entitled METHOD OF FABRICATING ZIRCALOY TUBING HAVING HIGH RESISTANCE TO CRACK PROPAGATION, both of which were filed on Apr. 23, 1993, assigned to the assignee hereof, and are incorporated herein by reference for all purposes.

In some embodiments, it will be desirable to perform an etch or other surface conditioning step to remove the inner liner from the cladding. This will yield a cladding in which the zirconium barrier layer forms the inner circumferential surface. Chemical and mechanical surface conditioning steps are currently employed in cladding fabrication. These include honing, grinding, sanding, machining with a lathe, buffing, chemical etching, and chemical mechanical polishing.

III. Examples

For ease in understanding the processes of this invention, two exemplary preferred processes according to this invention are now described. It should be understood that although the conditions described in these examples are quite specific, each step of the process could be conducted under a range of conditions. Both processes are started with a hollow beta quenched Zircaloy billet 100 (the substrate alloy tube), a zirconium sheath 102, and a Zircaloy inner liner sheath 104.

Figure 3:
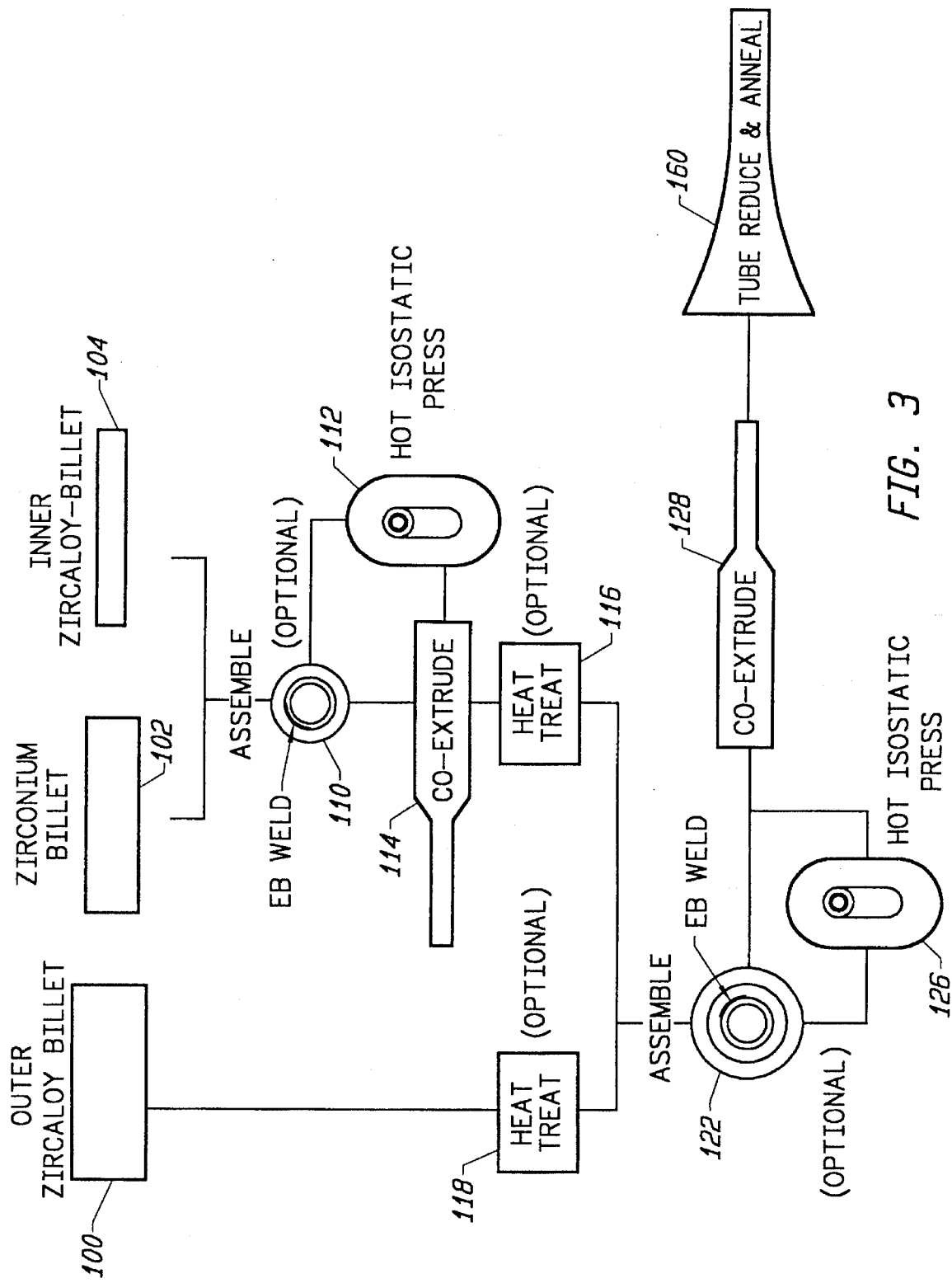
FIG. 3 is process flow diagram of one preferred embodiment of the present invention.

The process steps in a first example are described with reference to FIG. 3. First, the Zircaloy sheath selected to be the inner liner is concentrically inserted into the zirconium metal sheath selected to be the zirconium barrier. The ends of the barrier and inner liner sheaths are then bonded by electron beam welding in a step 110. The welded sheath is then subjected to an optional hot isostatic pressing step 112 as described above and extruded (step 114) at a tube temperature of about 570° C. to produce a zirconium/inner liner sheath. Thereafter, the resulting sheath is treated by a diffusion anneal (step 116) at about 800° C. for about four hours to diffuse alloying elements from the inner liner into the zirconium sheath as described above. The Zircaloy substrate tube may be heat treated in an optional step 118.

Next, the zirconium/inner liner sheath is concentrically inserted in the Zircaloy substrate tube and the ends are bonded by electron beam welding in a step 122. Thereafter, assembly is subjected to another optional hot isostatic pressing step 126 and then a coextrusion step 128 to produce the tubeshell.

Figure 4:
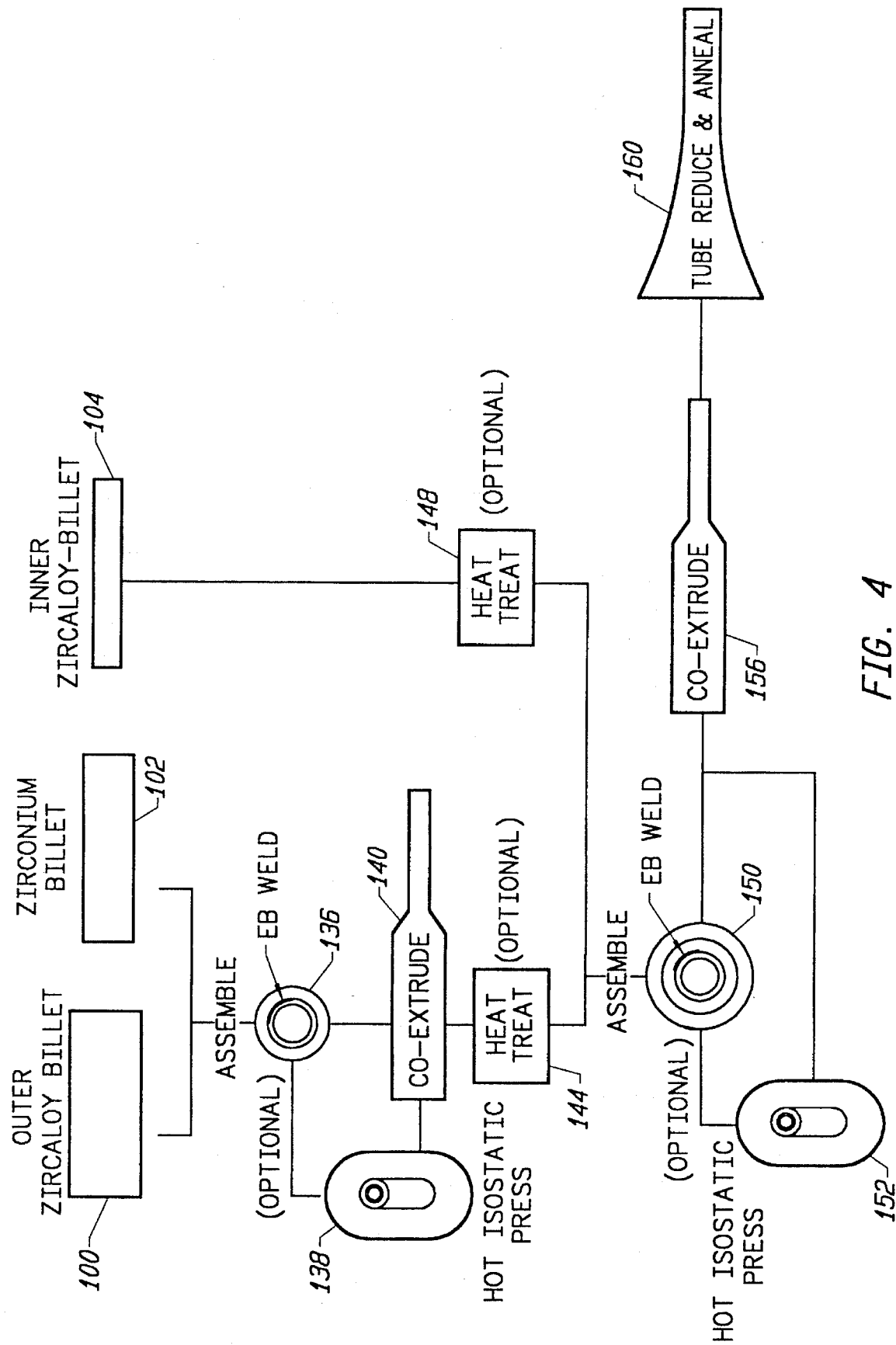
FIG. 4 is a process flow diagram of a second preferred embodiment of the present invention.

The process steps in the second example are described with reference to FIG. 4. First, the zirconium metal sheath and the Zircaloy substrate tube are concentrically assembled and electron beam welded in a step 136. The resulting assembly is subjected to an optional hot isostatic pressing in step 138 and an extrusion step 140. Thereafter, the extruded tube is annealed in a step 144 under the conditions sufficient to diffuse some alloying elements from the substrate tube through the zirconium barrier to the barrier interior surface. The inner liner is treated in an optional heat treatment step 148 and then concentrically assembled in the substrate/zirconium tube. The assembly is electron beam welded in a step 150. Thereafter, the assembly is subjected another optional hot isostatic pressing step 152 and an extrusion step 156 to yield a tubeshell as in the first example.

Regardless of whether the first or second example was employed to prepare the tubeshell, the remaining preferred process steps 160 (as described below) are identical. The tubeshell is subjected to three or more cold work passes in a pilger mill. It will be understood by the reader that pilger mills are generally available, albeit fairy complicated, pieces of equipment. During cold working with a pilger mill, a shaped die is rolled on the outside of the tube while a hard tapered mandrel supports the inside of the tube. In this manner, the wall thickness and diameter of the tube are simultaneously reduced.

The first pass cold work step is typically performed to about 69%. If the tube is given too much cold work in a single pass, it may crack during manufacture. To relieve the stress caused by cold working, the tube is annealed at about 593° C. for two hours in a large vacuum annealing furnace such as that described above (available from Centorr Vacuum Industries, located in Nashua, N.H.).

Next, the tube is heat treated at about 927° C. on the outer 30% of the wall. This is accomplished by heating the tubeshell with a high-energy or frequency (from an induction coil) which penetrates at most about 33% of the wall. During the induction heating water flows through the tube center. This serves two purposes: first it maintains the interior of the tube at a lower temperature while the outer region is heated, and second it very rapidly quenches the entire tube when the heating energy is removed. It is important to recognize that the inner portion of the tubeshell is not substantially heated. Further details of the induction heating process are provided in U.S. Pat. No. 4,576,654 to Eddens which is incorporated herein by reference for all purposes. This selective heating step imparts corrosion resistance to the outer region of the substrate by producing fine precipitates therein.

At this point, a second pass cold work is performed (this time to about 74%) with a pilger mill. To remove the stress induced by this second pass cold work step, another anneal (again at 593° C. for about 2 hours) is performed. Finally, the third pass cold work is performed as before. This reduces the tube to its final size—about one-half inch outer diameter with a nominal wall thickness of roughly 30 mils Thereafter, a diffusion anneal is conducted at 825° C. for five minutes.

This tube is cut up into lengths for fuel rods (i.e. about 14 feet long) and given a final recrystallization anneal at 577° C. for about two hours. Alternatively, the final anneal could be a stress relief anneal conducted at any temperature between about 480° C. to 577° C. After the final anneal, the tube is ready for use in the reactor.

It will be recognized by those of skill in the art that various steps are performed in addition to those listed in the above. For example, chemical etching is employed to remove superficial defects caused by the tube reduction mill. Further, straightening of tubes is often performed with pieces of equipment designed for this purpose. In addition, various nondestructive tests such as corrosion tests and ultrasonic tests for crack imperfections in the surface are performed. This is not an exhaustive list, but merely serves to describe some steps which may be employed.

The composite tubing of this invention can be used to make nuclear fuel elements by first affixing a closure to one end of the cladding tube so that only one open end remains. The completed fuel element is then prepared by filling the cladding container with nuclear fuel material, inserting a nuclear fuel material retaining means into the cavity, evacuating the cladding tube interior, pressurizing the interior with helium, applying a closure to the open end of the container, and bonding the ends of the cladding container to the closure to form a tight seal therebetween.

IV. Conclusion

Although the foregoing invention has been described in some detail for purposes of clarity of understanding, it will be apparent that certain changes and modifications may be practiced within the scope of the appended claims. For instance, although the specification has described three or four passes of cold work, other suitable processes having more or fewer cold work passes may be used as well.

What is claimed is:

1. A method of making a cladding tube having an outer substrate, an intermediate zirconium barrier layer, and an inner liner from an outer substrate alloy tube, a zirconium sheath, and an inner liner alloy sheath, each of the outer substrate alloy tube, a zirconium sheath, and an inner liner alloy sheath having interior and exterior circumferential surfaces, the method comprising the following steps:

(a) bonding the inner liner alloy sheath exterior circumferential surface to the zirconium sheath interior circumferential surface to form a barrier/inner liner sheath; and (b) bonding the exterior surface of the zirconium sheath on the barrier/inner liner sheath to the interior circumferential surface of the outer substrate alloy tube to form said cladding tube, wherein the outer substrate alloy tube becomes the outer substrate, the zirconium sheath becomes the intermediate zirconium barrier layer, and the inner liner alloy sheath becomes the inner liner.

2. The method of claim 1 wherein at least one of steps (a) and (b) is an extrusion step.

3. The method of claim 1 wherein both of steps (a) and (b) are extrusion steps.

4. The method of claim 1 wherein the step of bonding the inner liner alloy sheath exterior circumferential surface to the zirconium sheath interior circumferential surface includes the following steps:

conducting a hot isostatic press of the inner liner alloy sheath and the zirconium sheath; and coextruding the inner liner alloy sheath and the zirconium sheath.

5. The method of claim 1 further comprising a step of heat treating the barrier/inner liner sheath whereby some alloying elements from the inner liner alloy sheath diffuse into the zirconium sheath.

6. The method of claim 1 further comprising a step of heat treating the outer substrate alloy tube prior to the step of bonding the exterior surface of the zirconium sheath on the barrier/inner liner sheath to the interior circumferential surface of the outer substrate alloy tube, said heat treatment imparting a precipitate microstructure to the outer substrate alloy tube in which the precipitates have an average size distribution proximate the inner surface of the outer substrate alloy tube of at least about a first predefined diameter and the precipitates have an average size distribution proximate the outer surface of the outer substrate alloy tube of at most about a second predefined diameter, wherein the first predefined diameter is greater than the second predefined diameter.

7. The method of claim 6 wherein the first predefined diameter is about 0.2 micrometers and the second predefined diameter is about 0.1 micrometers.

8. The method of claim 1 wherein the step of bonding the exterior surface of the zirconium sheath on the barrier/inner liner sheath to the interior circumferential surface of the outer substrate alloy tube includes the following steps:

conducting a hot isostatic press of the barrier/inner liner sheath and the outer substrate alloy tube; and coextruding the barrier/inner liner sheath and the outer substrate alloy tube.

9. The method of claim 1 further comprising a plurality of tube reduction steps.

10. The method of claim 9 wherein the tube reduction steps comprise at least three cold work steps, each of at least about 35%.

11. The method of claim 9 wherein each tube reduction step independently is conducted with either a pilger mill or an HPTR machine.

12. A method of making a cladding tube having an outer substrate, an intermediate zirconium barrier layer, and an inner liner from an outer substrate alloy tube, a zirconium sheath, and an inner liner alloy sheath, each of the outer substrate alloy tube, a zirconium sheath, and an inner liner alloy sheath having interior and exterior circumferential surfaces, the method comprising the following steps:

(a) bonding the zirconium sheath exterior circumferential surface to the outer substrate alloy tube interior circumferential surface to form a substrate tube/barrier sheath; and (b) bonding the exterior circumferential surface of the inner liner alloy sheath to the interior circumferential surface of the zirconium sheath of the substrate tube/barrier sheath to form said cladding tube, wherein the outer substrate alloy tube becomes the outer substrate, the zirconium sheath becomes the intermediate zirconium barrier layer, and the inner liner alloy sheath becomes the inner liner.

13. The method of claim 12 wherein at least one of steps (a) and (b) is an extrusion step.

14. The method of claim 12 wherein both of steps (a) and (b) are extrusion steps.

15. The method of claim 12 wherein the step of bonding the zirconium sheath exterior circumferential surface to the outer substrate alloy tube interior circumferential surface includes the following steps:

conducting a hot isostatic press of the outer substrate alloy tube and the zirconium sheath; and coextruding the outer substrate alloy tube and the zirconium sheath.

16. The method of claim 12 further comprising a step of heat treating the substrate tube/barrier sheath whereby some alloying elements from the outer substrate alloy tube diffuse into the zirconium sheath.

17. The method of claim 12 wherein the step of bonding the exterior circumferential surface of the inner liner alloy sheath to the interior circumferential surface of the zirconium sheath of the substrate tube/barrier sheath includes the following steps:

conducting a hot isostatic press of the inner liner alloy sheath and the substrate tube/barrier sheath; and coextruding the inner liner alloy sheath and the substrate tube/barrier sheath.

* * * * *